US010774260B2

(12) United States Patent
Deville et al.

(10) Patent No.: US 10,774,260 B2
(45) Date of Patent: Sep. 15, 2020

(54) POLYVINYL ALCOHOL-BASED SHALE INHIBITOR

(71) Applicant: Halliburton Energy Services, Inc., Houston, TX (US)

(72) Inventors: Jay Paul Deville, Spring, TX (US); Philip Wayne Livanec, Dayton, TX (US); Hui Zhou, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/493,593

(22) Filed: Apr. 21, 2017

(65) Prior Publication Data
US 2017/0218251 A1 Aug. 3, 2017

Related U.S. Application Data

(63) Continuation-in-part of application No. 14/897,780, filed as application No. PCT/US2013/060909 on Sep. 20, 2013.

(51) Int. Cl.
*C09K 8/035* (2006.01)
*C09K 8/88* (2006.01)
(Continued)

(52) U.S. Cl.
CPC .............. *C09K 8/887* (2013.01); *C09K 8/035* (2013.01); *C09K 8/24* (2013.01); *C09K 8/68* (2013.01);
(Continued)

(58) Field of Classification Search
CPC ................................ C09K 8/887; C09K 8/035
(Continued)

(56) References Cited

U.S. PATENT DOCUMENTS 4,349,443 A  9/1982 Block
4,353,804 A  10/1982 Green et al.
(Continued)

FOREIGN PATENT DOCUMENTS

CA    2118070 A1   10/1994
CA    2537504 A1    3/2005
(Continued)

OTHER PUBLICATIONS

International Preliminary Report on Patentability issued in related PCT Application No. PCT/US2013/060909, dated Mar. 22, 2016, 22 pages.
(Continued)

*Primary Examiner* — William D Hutton, Jr.
*Assistant Examiner* — Ashish K Varma
(74) *Attorney, Agent, or Firm* — Tenley Krueger; Baker Botts L.L.P.

(57) ABSTRACT

Shale inhibiting additives for subterranean drilling and/or treatment fluids that include polyvinyl alcohol (PVA) are provided. In some embodiments, the methods include: providing a treatment fluid including an aqueous base fluid and a shale inhibiting additive including polyvinyl alcohol; introducing the treatment fluid into at least a portion of a subterranean formation to contact at least a portion of the subterranean formation that comprises shale; and allowing the shale inhibiting additive to interact with the shale in the subterranean formation to at least partially inhibit the shale.

8 Claims, 2 Drawing Sheets

(51) Int. Cl.
*C09K 8/68* (2006.01)
*C09K 8/72* (2006.01)
*C09K 8/24* (2006.01)

(52) U.S. Cl.
CPC .............. *C09K 8/685* (2013.01); *C09K 8/725* (2013.01); *C09K 8/88* (2013.01); C09K 2208/12 (2013.01)

(58) Field of Classification Search
USPC .......................................................... 175/65
See application file for complete search history.

(56) References Cited

U.S. PATENT DOCUMENTS

| | | | |
|---|---|---|---|
| 4,389,319 A | 6/1983 | Block et al. | |
| 4,411,800 A | 10/1983 | Green et al. | |
| 4,428,845 A | 1/1984 | Block | |
| 4,458,048 A | 7/1984 | Schmitt | |
| 4,458,052 A | 7/1984 | Schmitt | |
| 4,472,552 A | 9/1984 | Blouin | |
| 4,473,480 A * | 9/1984 | Green | C09K 8/10 507/114 |
| RE31,748 E | 11/1984 | Block | |
| 4,486,318 A | 12/1984 | Green et al. | |
| 4,529,522 A * | 7/1985 | Schmitt | C09K 8/588 166/275 |
| 4,541,485 A | 9/1985 | Block | |
| 4,545,911 A | 10/1985 | Schmitt | |
| 4,547,297 A | 10/1985 | Block | |
| 4,643,255 A | 2/1987 | Sandiford et al. | |
| 4,859,717 A * | 8/1989 | Hoskin | C08K 5/07 166/270 |
| 4,940,090 A | 7/1990 | Hoskin et al. | |
| 4,988,450 A | 1/1991 | Wingrave et al. | |
| 5,211,250 A | 5/1993 | Kubena, Jr. et al. | |
| 7,192,907 B2 | 3/2007 | Patel et al. | |
| 7,514,389 B2 | 4/2009 | Patel et al. | |
| 7,566,686 B2 * | 7/2009 | Kippie | C09K 8/12 507/110 |
| 7,815,731 B2 | 10/2010 | Beckman | |
| 2007/0082823 A1 | 4/2007 | Patel et al. | |
| 2007/0173414 A1 * | 7/2007 | Wilson, Jr. | C09K 8/04 507/240 |
| 2015/0344767 A1 | 12/2015 | Lei et al. | |
| 2016/0229936 A1 * | 8/2016 | Kumaki | C08F 8/12 |
| 2017/0002255 A1 | 1/2017 | Al-Olayan | |

FOREIGN PATENT DOCUMENTS

| | | |
|---|---|---|
| EP | 0186663 B1 | 5/1995 |
| WO | 1996003474 A2 | 2/1996 |
| WO | 2015041679 A1 | 3/2015 |

OTHER PUBLICATIONS

Ivanov, A. E. et al, "Synthesis of boronate-containing copolymers of N, N-dimethylacrylamide, their interaction with poly (vinyl alcohol) and rheological behaviour of the Gels," Polymer, 2004, vol. 45, pp. 2495-2505. See abstract: p. 2496, and figure 1.

Schexnailder, Patrick et al, "Nancomposite Polymer Hydrogels", Colloid and Polymer Science, 2009, vol. 287, pp. 1-11. See abstract; and pp. 4 and 5.

International Search Report and Written Opinion issued in related PCT Application No. PCT/US2013/060909, dated Jun. 24, 2014, 27 pages.

Alford, S.E., "North Sea Field Application of an Environmentally Responsible Water-base Shale Stabilizing System", SPE/IADC 21936, pp. 314-355.

* cited by examiner

POLYVINYL ALCOHOL-BASED SHALE INHIBITOR

CROSS-REFERENCE TO RELATED APPLICATIONS

This application claims priority to and is a continuation-in-part of U.S. patent application Ser. No. 14/897,780, filed on Dec. 11, 2015, and entitled "Drilling Fluid Composition Including Viscosifier and Method of Using the Same," which is a U.S. National Stage Application of International Application No. PCT/US2013/60909, filed Sep. 20, 2013, the entire disclosures of which are incorporated herein by reference.

BACKGROUND

The present disclosure relates to systems and methods for drilling and/or treating subterranean formations that include shale.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. For example, a fluid may be used to drill a well bore in a subterranean formation or to complete a well bore in a subterranean formation, as well as numerous other purposes. A drilling fluid, or "mud" which a drilling fluid is also often called, is a treatment fluid that is circulated in a well bore as the well bore is being drilled to facilitate the drilling operation. The various functions of a drilling fluid include removing drill cuttings from the well bore, cooling and lubricating the drill bit, aiding in support of the drill pipe and drill bit, and providing a hydrostatic head to maintain the integrity of the well bore walls and prevent well blowouts.

During drilling of subterranean well bores, various strata that include reactive shales may be encountered. As used herein, the term "shale" is defined to mean materials that may "swell," or increase in volume, when exposed to water. Examples of these shales include certain types of clays (for example, bentonite). Reactive shales may be problematic during drilling operations because of, inter alia, their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well bore until such time as the cuttings can be removed by solids control equipment located at the surface.

Shale disintegration also may impact "equivalent circulating density" ("ECD"). ECD may be affected by the solids content of the drilling fluid, which may increase if surface solids control equipment cannot remove shale from the drilling fluid. Plastic viscosity (an indicator of size and quantity of solids) is an important parameter that affects drilling rate. Maintenance of appropriate ECD is important in drilling a well bore where a narrow tolerance exists between the weight of the drilling fluid needed to control the formation pressure and the weight of the drilling fluid that will fracture the formation. In such circumstances, minimizing shale degradation may be desirable, inter alia, to control of the viscosity of the drilling fluid. Moreover, degradation of drilled cuttings prior to their removal at the surface may prolong drilling time because shale particles traveling up the well bore can break up into smaller and smaller particles, which can expose new surface area of the shale particles to the drilling fluid and lead to further absorption of water and degradation.

Shale degradation may substantially decrease the stability of the well bore, which may cause irregularities in the diameter of the well bore, e.g., the diameter of some portions of the well bore may be either smaller or greater than desired. In an extreme case, shale degradation may decrease the stability of the well bore to such an extent that the well bore collapses. Degradation of the shale also may interrupt circulation of the drilling fluid, cause greater friction between the drill string and the well bore, and/or cause the drill string to become stuck in the well bore. Accordingly, the complications associated with shale swelling during drilling may substantially increase the time and cost of drilling.

One technique used to counteract the propensity of aqueous drilling fluids to interact with reactive shales in a formation involves the use of certain additives in aqueous drilling fluids that may inhibit shale, e.g., additives that may demonstrate a propensity for reducing the tendency of shale to absorb water. Amphoteric materials (i.e., substances that may exhibit both acidic and/or alkaline properties) are one type of water-based shale inhibitor that has been used in the past. Amphoteric materials are believed to attach to the shale substrate, thus preventing water ingress. However, amphoteric inhibitors may be environmentally undesirable, especially in heavily regulated areas, because they typically demonstrate low biodegradability and high toxicity. Potassium chloride is another conventional shale-inhibiting component. However, potassium chloride may only be moderately effective at inhibiting shale swelling in some cases, and can be environmentally unacceptable in certain areas of the world since high concentrations of potassium ions may harm certain types of marine life or contaminate aquifers. Polyglycols have also been used as shale inhibitors in water-based drilling fluids, but have not demonstrated satisfactory inhibition levels. Partially hydrolyzed polyacrylamides (PHPA) and polyvinylpyrrolidone (PVP) have also been utilized in many regions, but these have been found to have undesirable properties in certain circumstances.

BRIEF DESCRIPTION OF THE DRAWINGS

These drawings illustrate certain aspects of some of the embodiments of the present disclosure, and should not be used to limit or define the claims.

Figure 1:
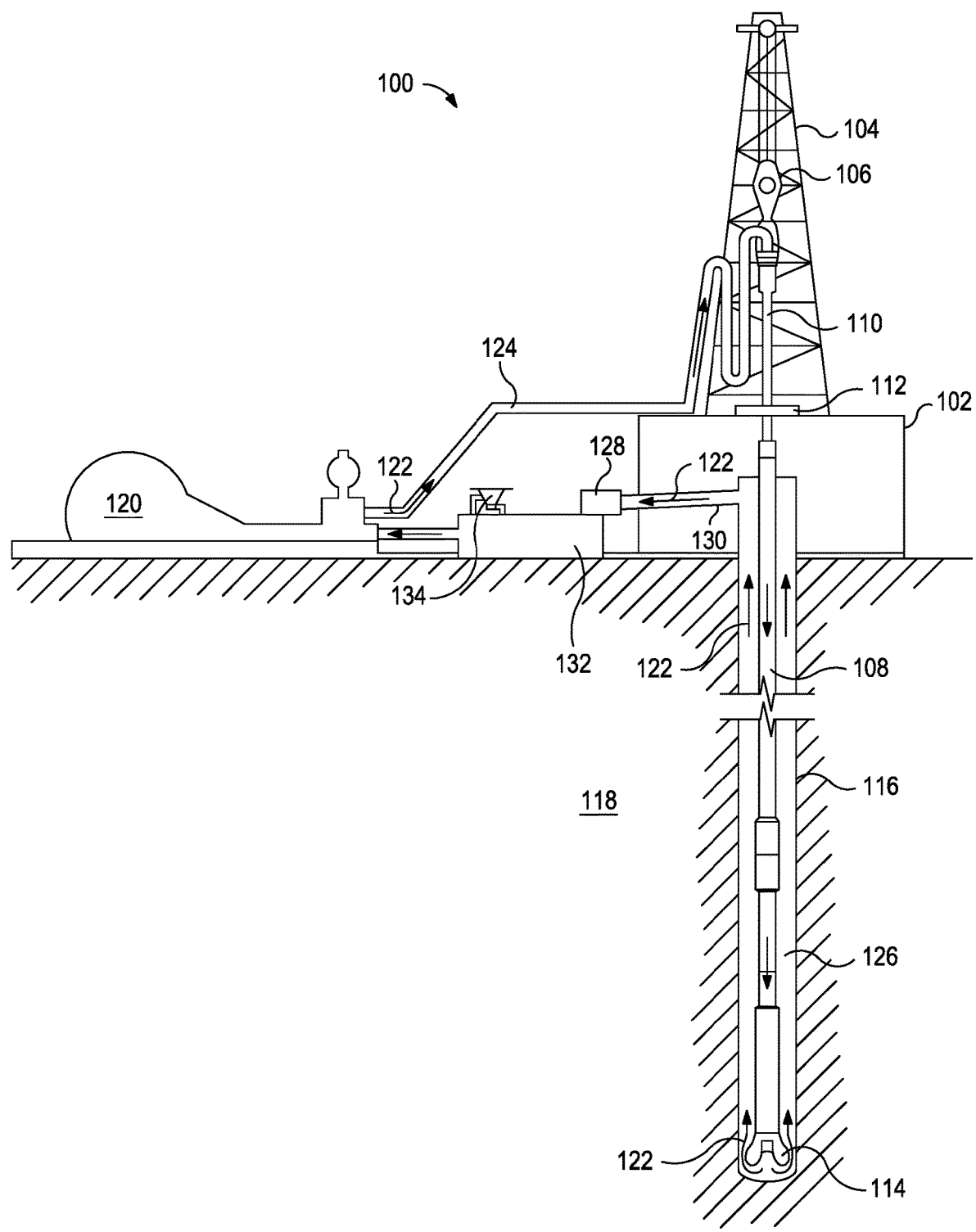
FIG. 1 is a diagram illustrating an example of a well bore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for drilling and/or treating subterranean formations that include shale. More particularly, the present disclosure relates to shale inhibiting additives for subterranean drilling and/or treatment fluids that include polyvinyl alcohol (PVA).

The present disclosure provides shale inhibiting additives for use in drilling fluids and/or other subterranean treatment fluids, and methods of drilling well bores in subterranean formations using those additives and fluids. The treatment fluids of the present disclosure generally include an aqueous base fluid and a shale inhibiting additive including polyvinyl alcohol. In some embodiments, the polyvinyl alcohol may be or include a crosslinked polyvinyl alcohol that includes a crosslinking agent that crosslinks at least a portion of the polyvinyl alcohol molecules therein. The methods of the present disclosure generally include: providing a treatment fluid including an aqueous base fluid and a shale inhibiting additive including polyvinyl alcohol; introducing the treatment fluid into at least a portion of a subterranean formation to contact at least a portion of the subterranean formation that includes shale; and allowing the shale inhibiting additive to interact with the shale in the subterranean formation to at least partially inhibit the shale.

Several different mechanisms may inhibit shale in subterranean formations, including but not limited to inhibition through charge interaction (e.g., using salts and amine based additives), blocking of pores in the formation matrix using inert materials (e.g., using nanomaterials) to prevent aqueous fluids from contacting shales in the formation, and/or at least partially encapsulating shale particles in order to at least partially stabilize shale particles and/or prevent their attrition and/or abrasion into smaller particles. As referenced herein, the phrase "inhibit shale", or variants thereof, refers to the action of one or more of these different inhibition mechanisms, either individually or collectively. In some embodiments, the methods and compositions of the present disclosure may provide a shale inhibiting additive that acts as shale encapsulator. As used herein, the term "encapsulation" and variants thereof do not imply any particular degree of encapsulation or coating, whether partial or otherwise. In some embodiments, a shale encapsulator may form a porous barrier or other structure around the outer surface of a shale particulate that may aid in holding the shale particle together and/or reducing its attrition, abrasion, and/or degradation into smaller particles.

Among the many potential advantages to the methods and compositions of the present disclosure, only some of which are alluded to herein, the methods, compositions, and systems of the present disclosure may effectively inhibit shale at concentrations lower than the concentration of other shale inhibitors needed to inhibit shale in a like manner. In some embodiments, the compositions of the present disclosure may exhibit increased biodegradability and/or fewer environmental problems as compared to certain shale inhibiting additives known in the art.

The treatment fluids (e.g., drilling fluids) used in the methods and systems of the present disclosure may include any aqueous base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In certain embodiments, the treatment fluids may include a mixture of one or more aqueous fluids with other fluids and/or gases, including but not limited to emulsions, foams, and the like. The polyvinyl alcohol of the present disclosure may include any polymeric material that includes PVA (e.g., homopolymers or copolymers), and may be obtained from any source known in the art. The PVA polymers may have any suitable molecular weight such as a molecular weight of about 5,000 g/mol to about 500,000 g/mol, 5,000 g/mol to about 200,000 g/mol, or about 5,000 g/mol or less, or about 10,000, 20,000, 25,000, 50,000, 100,000, 150,000, 200,000, 300,000, 400,000, or about 500,000 g/mol or more. In some embodiments, the PVA polymers may have a molecular weight of 10,000 g/mol to about 200,000 g/mol. In some embodiments, the PVA polymers may have a molecular weight of 140,000 g/mol to about 190,000 g/mol. In some embodiments, the PVA polymers may have a molecular weight of about 88,000 to about 97,000 g/mol. In some embodiments, the PVA polymers may have a molecular weight of about 13,000 to about 23,000 g/mol. In some embodiments, the PVA polymers may have an average molecular weight of about 146,000 to about 186,000 g/mol. When crosslinked, the crosslinked PVA polymers can have any suitable molecular weight, such as a molecular weight of about 5,000 g/mol to about 50,000,000 g/mol, about 10,000 g/mol to about 10,000,000 g/mol, about 20,000 g/mol to about 5,000,000 g/mol, or about 5,000 g/mol or less, or about 10,000, 20,000, 25,000, 50,000, 100,000, 150,000, 200,000, 300,000, 400,000, 500,000, 750,000, 1,000,000, 1,500,000, 2,000,000, 5,000,000, 10,000,000, 25,000,000, or about 50,000,000 g/mol or more. A source of PVA polymers also may be provided in a form that are partially hydrolyzed (e.g., with the unhydrolyzed portion of the PVA source provided as polyvinyl acetate), in any suitable proportion. In some embodiments, the PVA may be at least 50%, 60%, 70%, 75%, 80%, 85%, 90%, 95%, or 99% hydrolyzed. In some embodiments, the PVA may be 92% to 94% hydrolyzed. In some embodiments, the PVA may be 87% to 89% hydrolyzed.

In some embodiments, a portion of the molecules of the PVA may be crosslinked with a crosslinking agent. In other embodiments, the PVA molecules may not be crosslinked. As used herein, the term "crosslinking agent" includes any molecule, atom, or ion that is capable of forming one or more crosslinks between molecules of the crosslinkable polymer and/or between two or more atoms in a single molecule of the crosslinkable polymer. As used herein, the term "crosslink" as used herein refers to a covalent or ionic bond that links one polymer chain to another. The selection of crosslinked PVA or PVA that is not crosslinked for a particular application of the present disclosure may depend on, among other things, the desired viscosity of the fluid, the molecular weight of the PVA polymer, as well as other factors that will be recognized by a person of skill in the art with the benefit of this disclosure. For example, PVA having a relatively high molecular weight (e.g., about 150,000 g/mol or higher, or about 200,000 g/mol or higher) may effectively inhibit shale without being crosslinked, while PVA having a relatively low molecular weight (e.g., below about 150,000 g/mol) may not effectively inhibit shale without being crosslinked. However, PVA of any molecular weight may be provided and/or used in a crosslinked form as a shale inhibiting additive in accordance with the present disclosure.

When crosslinked, any crosslinking agent known in the art may be used. In some embodiments, suitable crosslinking agents may include at least one of a dialdehyde, a dialdehyde-forming compound, a carboxylic acid or an ester thereof, a sulfonic acid or an ester thereof, a phosphonic acid or an ester thereof, an acid anhydride, an epihalohydrin, a di-epoxide, or any combination thereof. Examples of such crosslinking agents that may be suitable in certain embodiments include, but are not limited to, epichlorohydrin, glutaraldehyde, succinaldehyde, paraformaldehyde, and other dialdehydes. In some embodiments, crosslinking agents may include one or more ions of chromium, aluminum, antimony, zirconium, titanium, calcium, boron, iron, silicon, copper, zinc, magnesium, or any combination thereof. Examples of such crosslinking agents that may be suitable in certain embodiments include, but are not limited to boric acid, borax, a borate, a $(C_1-C_{30})$hydrocarbylboronic acid, a $(C_1-C_{30})$hydrocarbyl ester of a $(C_1-C_{30})$ hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, aluminum citrate, or any combination thereof.

When used, the crosslinking agent may be included in the fluid in any suitable amount depending on, among other factors, the amount and/or molecular weight of the PVA polymers, the desired viscosity of the fluid, and the like. In some embodiments, the crosslinking agent may be included in amount that is about 0.1 to 5 times the amount of PVA included in the fluid. In some embodiments, the crosslinking agent may be included in amount that is about 0.2 to 3 times the amount of PVA included in the fluid. In some embodiments, the crosslinking agent may be included in amount that is about 0.5 to 2 times the amount of PVA included in the fluid. In some embodiments, the crosslinking agent may be included in amount that is about 1.5 times the amount of PVA included in the fluid.

The shale inhibiting additives including PVA may be provided in a treatment fluid in any suitable amount. In some embodiments, the shale inhibiting additive may be included in the treatment fluid in an active concentration of from about 0.1 pounds per barrel (lb/bbl) to about 20 lb/bbl. In some embodiments, the shale inhibiting additives may be included in the treatment fluid in an active concentration of from about 0.2 lb/bbl to about 10 lb/bbl. In some embodiments, the shale inhibiting additives may be included in the treatment fluid in an active concentration of from about 0.5 lb/bbl to about 5 lb/bbl. In some embodiments, the shale inhibiting additives may be included in the treatment fluid in an active concentration of from about 0.5 lb/bbl to about 1.5 lb/bbl. A person of skill in the art with the benefit of this disclosure will recognize suitable amounts of the shale inhibiting additive to include in a treatment fluid of the present disclosure based on, among other things, the amount and/or reactivity of shale in the formation, other components of the treatment fluid (e.g., brines), the desired viscosity of the treatment fluid, and other parameters of the operation in which the treatment fluid will be used.

In some embodiments, the treatment fluids of the present disclosure may contain one or more salts, inter alia, to provide the desired density to the treatment fluid. One of ordinary skill in the art, with the benefit of this disclosure, will recognize the need for caution when combining a salt with a treatment fluid for use in certain regions of the world where such use of a salt may be subject to environmental restrictions. One of ordinary skill in the art will also recognize where it is desirable to use a dense brine rather than, among other things, a solid weighting agent. Where the use of a salt is permissible, a variety of salts may be used. Examples of suitable salts include, but are not limited to, potassium chloride, sodium chloride, potassium formate, potassium carbonate, calcium chloride, and calcium bromide. In certain embodiments, a mixture of suitable salts may be used. In certain embodiments, the salts may be present in the treatment fluids of the present disclosure in an amount in the range of from about 5 pounds per barrel to about the salt saturation limit of the treatment fluid.

In some embodiments, the treatment fluids used in the methods and systems of the present disclosure optionally may include one or more weighting agents, among other purposes, to provide a treatment fluid of the desired weight and/or density for the subterranean formation in which it is used. Examples of weighting agents that may be suitable in certain embodiments include but are not limited to, barites (barium sulfate), hematite, iron ores, siderite, ilmenite, galena, carbonates (e.g., calcium carbonate, magnesium carbonate, iron carbonate, zinc carbonate), manganese tetraoxide, chloride salts (e.g., NaCl, KCl, $CaCl_2$), formate salts, and any combination thereof. These weighting agents may be at least partially soluble or insoluble in the treatment fluid. The weighting agents may be included in a treatment fluid in any amount needed to impart the desired properties to the fluid. In some embodiments, a weighting agent may be present in the treatment fluids in an amount of from about 1% to about 60% by weight of the treatment fluid (e.g., about 5%, about 10%, about 15%, about 20%, about 25%, about 30%, about 35%, about 40%, about 45%, about 50%, about 55%, etc.). In some embodiments, the weighting agents may be present in the treatment fluids in an amount of from about 1% to about 35% by weight of the treatment fluid. In some embodiments, the weighting agent may be present in the treatment fluids in an amount of from about 1% to about 10% by weight of the treatment fluid.

In some embodiments, the treatment fluids used in the methods and systems of the present disclosure optionally may include any number of additional additives. Examples of such additional additives include, but are not limited to, salts, surfactants, acids, proppant particulates, diverting agents, filtration agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional shale inhibitors, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the shale inhibiting additives and/or other components of the treatment fluid may be metered directly into a base treatment fluid to form a treatment fluid. In certain embodiments, the base fluid may be mixed with the shale inhibiting additives and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluid such as a drilling fluid of the present disclosure may be introduced into at least a portion of a well bore as it is drilled to penetrate at least a portion of a subterranean formation. The drilling fluid may be circulated in the well bore during drilling, among other reasons, to cool and/or lubricate a drill bit and/or drill pipe to prevent them from sticking to the walls of the wellbore, prevent blowouts by serving as a hydrostatic head to counteract the sudden entrance into the well bore of high pressure formation fluids, suspend or remove formation cuttings from the well bore, and/or enhance the stability of the well bore during drilling.

The treatment fluids and shale inhibiting additives disclosed herein may directly or indirectly affect one or more components or pieces of equipment associated with the preparation, delivery, recapture, recycling, reuse, and/or disposal of the disclosed treatment fluids and shale inhibiting additives. For example, and with reference to FIG. 1, the disclosed treatment fluids and shale inhibiting additives may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed shale inhibiting additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed shale inhibiting additives may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed shale inhibiting additives may be stored, reconditioned, and/or regulated until added to the drilling fluid 122.

As mentioned above, the disclosed shale inhibiting additives may directly or indirectly affect the components and equipment of the drilling assembly 100. For example, the disclosed shale inhibiting additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the shale inhibiting additives.

The disclosed shale inhibiting additives may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids and shale inhibiting additives may also directly or indirectly affect the mixing hopper 134 and the retention pit 132 and their assorted variations.

The disclosed treatment fluids and/or shale inhibiting additives may also directly or indirectly affect the various downhole equipment and tools that may come into contact with the treatment fluids and shale inhibiting additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treat treatment fluids and/or shale inhibiting additives may also directly or indirectly affect any downhole heat exchangers, valves and corresponding actuation devices, tool seals, packers and other wellbore isolation devices or components, and the like associated with the wellbore 116. The disclosed treatment fluids and/or shale inhibiting additives may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluids and/or shale inhibiting additives may also directly or indirectly affect any transport or delivery equipment used to convey the treatment fluids and/or shale inhibiting additives to the drilling assembly 100 such as, for example, any transport vessels, conduits, pipelines, trucks, tubulars, and/or pipes used to fluidically move the treatment fluids and/or shale inhibiting additives from one location to another, any pumps, compressors, or motors used to drive the treatment fluids and/or shale inhibiting additives into motion, any valves or related joints used to regulate the pressure or flow rate of the treatment fluids and/or shale inhibiting additives, and any sensors (i.e., pressure and temperature), gauges, and/or combinations thereof, and the like.

An embodiment of the present disclosure is a method that includes: providing a treatment fluid including an aqueous base fluid and a shale inhibiting additive including polyvinyl alcohol; introducing the treatment fluid into at least a portion of a subterranean formation to contact at least a portion of the subterranean formation that comprises shale; and allowing the shale inhibiting additive to interact with the shale in the subterranean formation to at least partially inhibit the shale.

In one or more embodiments described in the preceding paragraph, the shale inhibiting additive includes a crosslinked polyvinyl alcohol that includes a crosslinking agent that crosslinks at least a portion of the polyvinyl alcohol. In one or more embodiments described above, the crosslinking agent includes at least one component selected from the group consisting of: epichlorohydrin, an epoxide, formaldehyde, glutaraldehyde, paraformaldehyde, and any combination thereof. In one or more embodiments described above, the crosslinking agent is present in the treatment fluid in an amount equal to about 1.5 times the amount of the polyvinyl alcohol by weight. In one or more embodiments described above, the polyvinyl alcohol has an average molecular weight of from about 10,000 g/mol to about 200,000 g/mol. In one or more embodiments described above, the polyvinyl alcohol has an average molecular weight that is greater than or equal to 100,000 g/mol. In one or more embodiments described above, the polyvinyl alcohol has an average molecular weight of from about 140,000 g/mol to about 190,000 g/mol. In one or more embodiments described above, the aqueous base fluid includes a brine. In one or more embodiments described above, introducing the treatment fluid into at least a portion of a subterranean formation includes circulating the treatment fluid in at least a portion of a well bore being drilled to penetrate the portion of the subterranean formation.

Another embodiment of the present disclosure is a method that includes: drilling at least a portion of a well bore to penetrate at least a portion of a subterranean formation that comprises shale; circulating a drilling fluid in at least a portion of the well bore while drilling at least a portion of the well bore, the drilling fluid including an aqueous base fluid and a shale inhibiting additive including polyvinyl alcohol; and allowing the shale inhibiting additive to interact with the shale in the subterranean formation to at least partially inhibit the shale.

In one or more embodiments described in the preceding paragraph, the shale inhibiting additive includes a crosslinked polyvinyl alcohol that includes a crosslinking agent that cros slinks at least a portion of the polyvinyl alcohol. In one or more embodiments described above, the crosslinking agent includes at least one component selected from the group consisting of: epichlorohydrin, an epoxide, formaldehyde, glutaraldehyde, paraformaldehyde, and any combination thereof. In one or more embodiments described above, the crosslinking agent is present in the treatment fluid in an amount equal to about 1.5 times the amount of the polyvinyl alcohol by weight. In one or more embodiments described above, the polyvinyl alcohol has an average molecular weight that is greater than or equal to 100,000 g/mol. In one or more embodiments described above, the polyvinyl alcohol has an average molecular weight of from about 140,000 g/mol to about 190,000 g/mol. In one or more embodiments described above, the aqueous base fluid includes a brine.

Another embodiment of the present disclosure is a method that includes: drilling at least a portion of a well bore to penetrate at least a portion of a subterranean formation that comprises shale; circulating a drilling fluid in at least a portion of the well bore while drilling at least a portion of the well bore, the drilling fluid including an aqueous base fluid that includes a brine, and a shale inhibiting additive that includes a polyvinyl alcohol homopolymer, wherein at least a portion of the polyvinyl alcohol homopolymer is crosslinked with a crosslinking agent that includes an epihalohydrin, the polyvinyl alcohol homopolymer has an average molecular weight of from about 140,000 g/mol to about 190,000 g/mol, and the polyvinyl alcohol homopolymer is present in an active concentration of about 0.5 lbs/bbl to about 1.5 lbs/bbl; and allowing the shale inhibiting additive to interact with the shale in the subterranean formation to at least partially inhibit the shale.

In one or more embodiments described in the preceding paragraph, the crosslinking agent is present in the drilling fluid in an amount equal to about 1.5 times the amount of the polyvinyl alcohol homopolymer by weight.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

Five different formulations of fluid samples including shale inhibiting additives of the present disclosure were prepared using different types of polyvinyl alcohol (PVA) as described in Table 1 below, as well as an epichlorohydrin crosslinking agent (99%) and an aqueous NaOH solution. The viscosity of fluid samples containing these additives was visually observed. At least the fluid samples noted below as having gelled or thickened indicate that the PVA had crosslinked to at least some degree.

TABLE 1

| Sample | % Hydrolyzed | Molecular Weight | Supplier |
|---|---|---|---|
| PVA-A | 92-94 | 146,000-186,000 | Acros |
| PVA-B | 87-89 | 13,000-23,000 | Aldrich |

Sample #1: 5 g of PVA-A was dissolved in 95 g of boiling water in a beaker with magnetic stirring. While stirring, 2 g of NaOH (an amount of aqueous solution was added to give 2 g of sodium hydroxide) was added. After the PVA was fully dissolved, the solution was cooled and 1.75 g (1.5 mL) of an epichlorohydrin crosslinker was added. The beaker was covered with foil and stirred for approximately 48 hours. After 16 hours the reaction had gelled considerably and after 48 hours a thick gel product was formed that was ~5% active cross-linked PVA.

Sample #2: 5 g of PVA-A was dissolved in 95 g of boiling water in a beaker with magnetic stirring. While stirring, 0.5 g of NaOH (an amount of aqueous solution was added to give 0.5 g of sodium hydroxide) was added. After the PVA was fully dissolved, the solution was cooled and 0.875 g (0.74 mL) of an epichlorohydrin crosslinker was added. The beaker was covered with foil and stirred for approximately 48 hours. After 16 hours the reaction had thickened somewhat, but was still very fluid. After 48 hours no further visual changes in the viscosity were noted. The product was a ~5% active cross-linked PVA.

Sample #3: 5 g of PVA-A was dissolved in 95 g of boiling water in a beaker with magnetic stirring. While stirring, 0.75 g of NaOH (1.7 mL of 43% aq. NaOH) was added. After the PVA was fully dissolved, the solution was cooled and 1.31 g (1.1 mL) of an epichlorohydrin crosslinker was added. The beaker was covered with foil and stirred for approximately 48 hours. After 16 hours the reaction had thickened somewhat, but was still very fluid. After 48 hours no further visual changes in the viscosity were noted. The product was a ~5% active cross-linked PVA.

Sample #4: 5 g of PVA-A was dissolved in 95 g of boiling water in a beaker with magnetic stirring. While stirring, 0.33 g of NaOH (0.77 mL of 43% aq. NaOH) was added. After the PVA was fully dissolved, the solution was cooled and 0.583 g (0.50 mL) of an epichlorohydrin crosslinker was added. The beaker was covered with foil and stirred for approximately 48 hours. After 16 hours the reaction had thickened somewhat, but was still very fluid. After 48 hours no further visual changes in the viscosity were noted. The product was a ~5% active cross-linked PVA.

Sample #5: 10 g of PVA-B was dissolved in 90 g of boiling water in a beaker with magnetic stirring. While stirring, 6 g of NaOH (14 mL of 43% aq. NaOH) was added. After the PVA was fully dissolved, the solution was cooled and 5.25 g (4.5 mL) of an epichlorohydrin crosslinker was added. The beaker was covered with foil and stirred for approximately 48 hours. After 48 hours little to no thickening was observed. The product was a ~10% active cross-linked PVA.

Example 2

Figure 2:
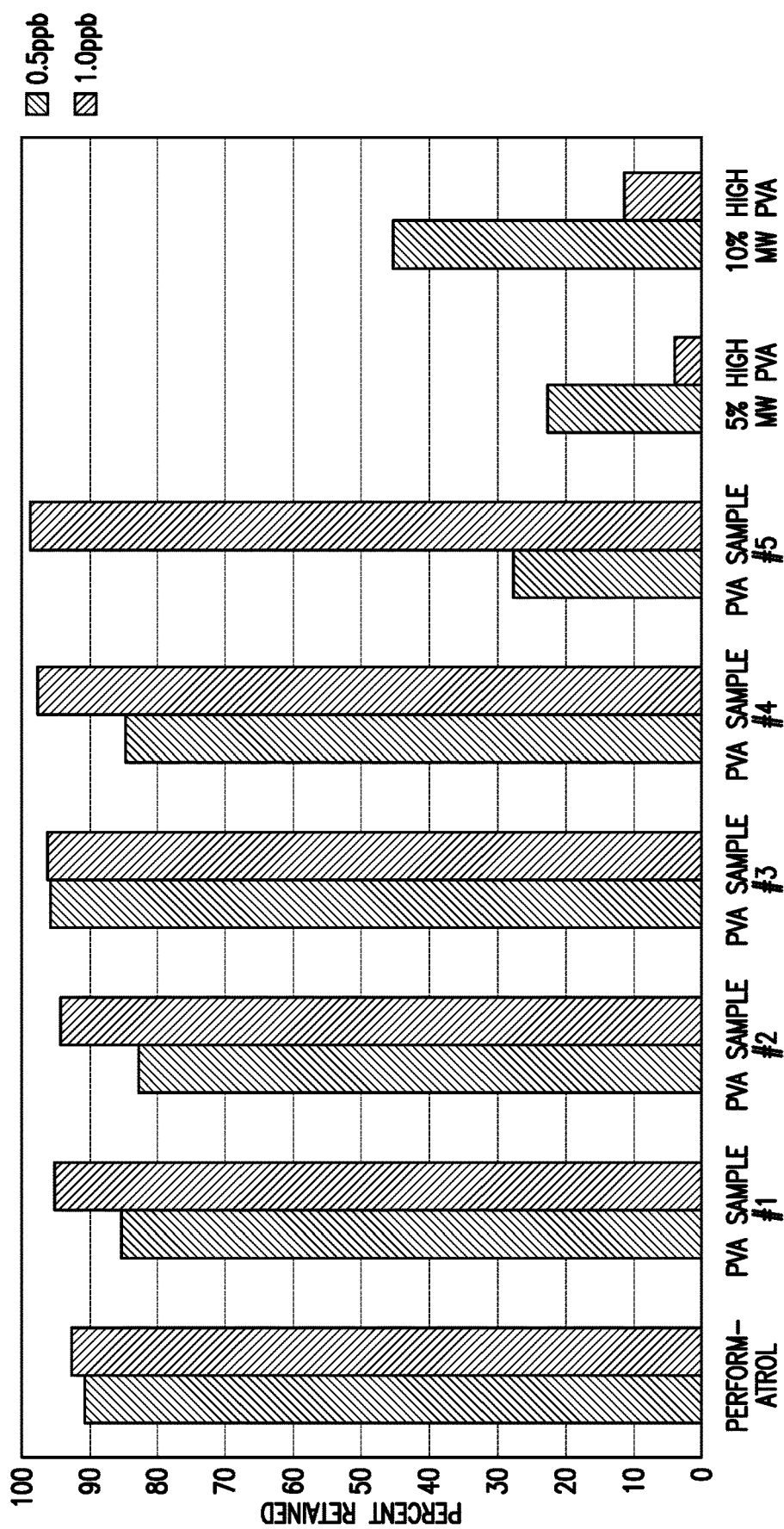
FIG. 2 is a graph illustrating data from shale retention tests using various types of shale inhibiting additives, including certain shale inhibitors of the present disclosure.

Each of the samples in Example 1 was used to perform a shale retention test according to American Petroleum Institute (API) Recommended Practice 13I: Shale-particle disintegration test by hot rolling. The samples were all tested in potassium chloride (KCl) brines having a weight of 8.6 pounds per gallon (ppg), and were hot rolled at 150° F. for 16 hours. Fluids including high molecular weight PVA (5% active or 10% active) without a crosslinker and a fluid including a known shale inhibiting additive (PERFORMATROL® shale stabilizer, available from Halliburton Energy Services, Inc.) were also used to perform shale inhibition tests in the same manner at the same concentrations. Each fluid was tested at 0.5 lbs/bbl and 1 lbs/bbl active concentrations of the PVA or PERFORMATROL® additive. The results of those tests are shown in Table 2 below and in FIG. 2.

TABLE 2

| | % Shale Retained | |
|---|---|---|
| Sample | 0.5 lbs/bbl | 1 lbs/bbl |
| PERFORMATROL ® | 90.7 | 92.7 |
| PVA-A Additive in Sample #1 | 85.4 | 95.2 |
| PVA-A Additive in Sample #2 | 83 | 94.3 |
| PVA-A Additive in Sample #3 | 95.7 | 98.3 |
| PVA-A Additive in Sample #4 | 84.7 | 97.7 |
| PVA-B Additive in Sample #5 | 27.7 | 98.7 |
| 5% high MW PVA (no crosslinker) | 22.9 | 4 |
| 10% high MW PVA (no crosslinker) | 45.4 | 11.5 |

As shown, the fluids that included Samples 1, 2, 3, and 4 from Example 1 all showed good shale retention at 0.5 and 1.0 lbs/bbl active concentrations of the shale inhibiting additive, and performed comparably to the fluids including the PERFORMATROL® additive. Moreover, even PVA that was not crosslinked showed some improvement of shale retention.

Example 3

Next, certain embodiments of treatment fluids of the present disclosure were prepared to include the PVA-A additive as prepared in Sample #3 from Example 1 (as well as certain other known additives that may be included in a subterranean drilling fluid), and the treatment fluids were used to perform a shale retention test according to an API standard test for shale retention. For comparison, treatment fluids that included the PERFORMATROL® shale stabilizer at the same active concentrations were also prepared and tested under the API standard test. Different treatment fluids were prepared using fresh water or 8.6 ppg KCl brine, and at 1 lbs/bbl active concentrations of the shale inhibiting additive (10 lbs/bbl product for the PERFORMATROL® additive; 20 lbs/bbl product for the PVA-A additive as prepared in Sample #3 from Example 1). The complete formulations for those fluids are shown in Table 3 below. In the shale retention test, the fluids were all hot rolled at 150° F. for 16 hours, and the results of the shale retention tests are shown in Table 4. As shown, the crosslinked PVA additive performed as well as the PERFORMATROL® in a KCl brine-based fluid.

TABLE 3

| Component | Fresh Water | KCl Brine |
| --- | --- | --- |
| Fresh water, bbl | 0.96 (336 g) | — |
| 8.6 ppg KCl brine, bbl | — | 0.95 (332.5 g) |
| BARAZAN D PLUS, lb | 1.2 | 1.2 |
| DEXTRID E, lb | 8.77 | 8.77 |
| PAC-L, lb | 2.1 | 2.1 |
| Soda Ash, lb | 0.35 | 0.35 |
| PERFORMATROL ®, lbs/bbl | 10 | 10 |
| PVA-A additive per Sample #3, lbs/bbl | 20 | 20 |

TABLE 4

| Additive (1 lbs/bbl active) | Fresh Water | KCl Brine |
| --- | --- | --- |
| PERFORMATROL ®, % retained | 26.7 | 92.6 |
| PVA-A additive per Sample #3, % retained | 10.2 | 92.8 |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising an aqueous base fluid and a shale inhibiting additive comprising polyvinyl alcohol and a crosslinking agent that crosslinks at least a portion of the polyvinyl alcohol, wherein the polyvinyl alcohol has an average molecular weight of from about 140,000 g/mol to about 190,000 g/mol and the crosslinking agent comprises at least one di-epoxide component present in the treatment fluid in an amount equal to about 1.5 times the amount of the polyvinyl alcohol by weight;
introducing the treatment fluid into at least a portion of a subterranean formation to contact at least a portion of the subterranean formation that comprises shale; and
allowing the shale inhibiting additive to interact with the shale in the subterranean formation to at least partially inhibit the shale.

2. The method of claim 1 wherein the aqueous base fluid comprises a brine.

3. The method of claim 1 wherein introducing the treatment fluid into at least a portion of a subterranean formation comprises circulating the treatment fluid in at least a portion of a well bore being drilled to penetrate the portion of the subterranean formation.

4. A method comprising:
drilling at least a portion of a well bore to penetrate at least a portion of a subterranean formation that comprises shale;
circulating a drilling fluid in at least a portion of the well bore while drilling at least a portion of the well bore, the drilling fluid comprising an aqueous base fluid and a shale inhibiting additive comprising a crosslinked polyvinyl alcohol that comprises a crosslinking agent that crosslinks at least a portion of the polyvinyl alcohol, wherein the crosslinking agent comprises at least one di-epoxide component present in the treatment fluid in an amount equal to about 1.5 times the amount of the polyvinyl alcohol by weight; and
allowing the shale inhibiting additive to interact with the shale in the subterranean formation to at least partially inhibit the shale.

5. The method of claim 4 wherein the polyvinyl alcohol has an average molecular weight that is greater than or equal to 100,000 g/mol.

6. The method of claim 4 wherein the polyvinyl alcohol has an average molecular weight of from about 140,000 g/mol to about 190,000 g/mol.

7. The method of claim 4 wherein the aqueous base fluid comprises a brine.

8. A method comprising:
drilling at least a portion of a well bore to penetrate at least a portion of a subterranean formation that comprises shale;
circulating a drilling fluid in at least a portion of the well bore while drilling at least a portion of the well bore, the drilling fluid comprising
an aqueous base fluid that comprises a brine, and
a shale inhibiting additive comprising a polyvinyl alcohol homopolymer, wherein
at least a portion of the polyvinyl alcohol homopolymer is crosslinked with a crosslinking agent that comprises a di-epoxide present in the treatment fluid in an amount equal to about 1.5 times the amount of the polyvinyl alcohol by weight,
the polyvinyl alcohol homopolymer has an average molecular weight of from about 140,000 g/mol to about 190,000 g/mol, and
the polyvinyl alcohol homopolymer is present in an active concentration of about 0.5 lbs/bbl to about 1.5 lbs/bbl; and
allowing the shale inhibiting additive to interact with the shale in the subterranean formation to at least partially inhibit the shale.

* * * * *